United States Patent Office 3,410,791
Patented Nov. 12, 1968

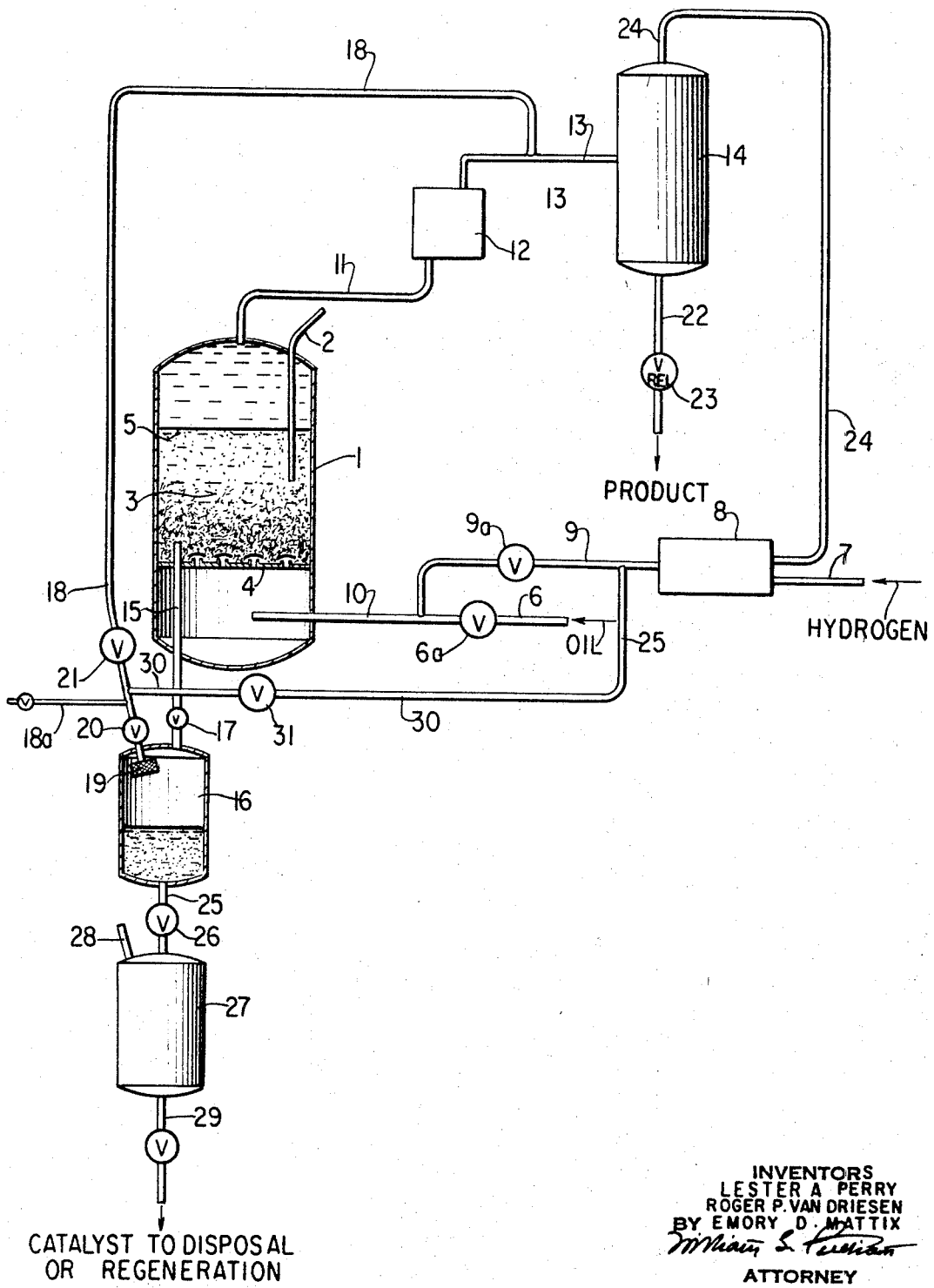

3,410,791
METHOD FOR DISCHARGING MIXTURE OF PARTICULATE SOLIDS AND FLUIDS FROM HIGH PRESSURE VESSEL
Lester A. Perry, Lake Charles, La., Roger P. Van Driesen, Hopewell, N.J., and Emory D. Mattix, Lake Charles, La., assignors to Cities Service Research and Development Company, New York, N.Y., a corporation of Delaware
Filed Aug. 25, 1965, Ser. No. 482,536
14 Claims. (Cl. 208—143)

ABSTRACT OF THE DISCLOSURE

This invention pertains to a method for continually discharging particulate solids in mixture with fluids from a high pressure vessel without disrupting the operation of the high pressure vessel. Thus, a particulate solid catalyst and fluid mixture is discharged from a high pressure hydrogenation vessel to a fluid-solid separation zone or pot where the fluids are continually vented from the pot through a venting conduit to the effluent stream of the hydrogenation vessel until the accumulation of the catalyst particles in the pot builds up across the venting conduit and decreases the flow of fluid to the effluent stream. The discharge of the particulate catalyst and fluid mixture from the hydrogenation vessel is then terminated after which any entrained fluid or gas is flared off to the atmosphere and the solids accumulated in the pot are discharged at relatively low pressures to another pot maintained at flare pressure.

---

The present invention relates to an improved method for discharging particulate solids maintained in contact with fluid within a high pressure vessel.

The improvements provided by the invention are broadly applicable to the discharge of particulate solids maintained in contact with fluids, i.e., liquids and/or gases, from vessels in which various types of reaction, conversion or like operations are carried out at super-atmospheric pressure. However, the invention is especially useful in the withdrawal of particulate solids, e.g. catalyst, from a liquid hydrocarbon treatment zone. For example, the invention has application in the removal of spent catalyst from a treatment zone in which a heavy hydrocarbon oil is contacted with gaseous hydrogen at high temperatures (e.g. 400° to 1500° F.) and high pressures (e.g. 1,000 to 5,000 p.s.i.g.) for the purpose of effecting hydrocracking, hydrodesulfurization, or like hydrogenation reactions. To effect hydrogenation reactions of this type, it has been found advantageous to pass the hydrocarbon oil and hydrogen upwardly through a bed of particulate catalyst under conditions such that the catalyst particles are maintained in random motion to become a so-called "ebullated bed."

It is one object of the present invention to provide an efficient process for discharging particulate solid in admixture with fluid from a high pressure vessel.

It is another object of the invention to provide an improved process for discharging particulate solid in admixture with fluid from a high pressure vessel whereby the fluid may be efficiently and economically separated from the particulate solid.

It is another object of the invention to provide an improved process for discharging particulate solid in admixture with liquid hydrocarbon and hydrogen from the high pressure hydrogenation zone, such as an ebullated bed hydrogenation zone.

Briefly, these and other objects and advantages of the invention as will appear from the following detailed description thereof are accomplished by discharging particulate solid in admixture with fluid at a low pressure differential from a high pressure vessel to a high pressure fluid-solid separation zone, venting fluid, substantially free of solid, to a point downstream of the high pressure vessel, e.g. a fluid recovery zone, and subsequently recovering the separated particulate solid from the fluid-solid separation zone at a low pressure differential.

In operations wherein the fluid is a mixture of gases or liquids, or a gas-liquid mixture, the fluid recovery zone may be a separation zone. For example, in the hydrogenation of hydrocarbon oils, the hydrogen-liquid hydrocarbon mixture separated from solids may be vented to a gas-liquid separation zone.

The fluid vented from the high pressure fluid-solid separation zone should be substantially free of solid. To preclude venting of particulate solid therewith, the fluid may, for example, be vented through a suitable screen. Other means for insuring against the venting of substantial amounts of solid particles with fluid may also be employed.

In accordance with a particularly preferred embodiment of the invention, the fluid is vented at a low pressure differential from the fluid-solid separation zone to a high pressure fluid recovery zone, which, as previously noted, may be a separation zone. By this procedure, erosion of pipes and valves, as may be caused by venting at a high differential, is avoided.

A more complete understanding of the invention may be had by referring to the drawing which diagrammatically depicts a process for hydrocracking hydrocarbon oils, and includes a preferred embodiment for discharging a mixture of catalyst-liquid hydrocarbon-hydrogen from a hydrocracking zone in accordance with the invention.

The reactor represented by reference numeral 1 is generally a vessel capable of withstanding pressures on the order of 1,000 to 5,000 p.s.i.g. and temperatures on the order of 400° F. to 1500° normally associated with hydrocracking operations. The reactor is supplied with particulate solid, which is preferably catalytic in nature, through conduit 2 extending downwardly into the reactor to form a bed 3 supported on a conventional bubble cap tray 4 or other suitable means. The stationary volume of the catalyst bed 3, i.e. the volume of the bed when the hydrogenation process is not in operation, is generally from about ¼ to about 9/10 the volume of the bed during operation, the upper level of which is denoted by reference numeral 5. A more complete understanding of an ebullated bed-type hydrogenation process may be had by referring to U.S. Patent 2,987,465 of Johanson.

As is well-known in the art, suitable hydrocracking catalyst include, for instance, cobalt, iron, nickel, tungsten, molybdenum, cobalt-molybdenum, etc. Such catalysts as well as their sulfides and oxides, may be used alone or together with other suitable catalysts such as naturally occurring clays, etc., or in combination with each other. The catalysts may also be supported on suitable bases, such as alumina, silica or silica-alumina. Generally speaking, the diameters of the catalyst particles generally range from about $\frac{1}{48}$ inch to about ½ inch and preferably are in the form of elongated extrudates.

Hydrocarbon oil feed entering through conduit 6, provided with a valve 6a, and hydrogen feed entering through conduit 7, compressor 8, and conduit 9, the latter being provided with valve 9a, are combined and passed through conduit 10 into the lower portion of the reactor 1. Prior to being charged to the reactor, the admixture may be passed through a preheater, not shown. The admixture of hydrogen and oil feed charged to the reactor passes upwardly through the bubble cap tray 4 and is thereby uniformly distributed through the catalyst bed 3 in the hydrogenation zone. The velocity at which the hydrogen and oil feed is passed upwardly through the catalyst bed 3 is such that the particles are maintained in a state of ebullation, the gross mass thereof expanding to an upper level as denoted by 5.

The liquid and gaseous reactor effluent may be withdrawn from the reactor by means of conduit 11, passed through a heat exchanger 12 to lower the temperature thereof, and then passed through conduit 13 to a gas-liquid separator 14. The gas-liquid separator is operated at a pressure which is substantially the same as that in the reactor 1, i.e. the pressure differential existing between separator 14 and reactor 1 is due substantially solely to frictional pressure loss in conduits 11 and 13 and heat exchanger 12. Ordinarily, the pressure differential existing between the gas-liquid separator 14 and the reactor 1 is no more than about 150 p.s.i., and preferably is less than about 30 p.s.i.

In the practice of the present invention, particulate catalyst in admixture with liquid hydrocarbon and hydrogen is withdrawn from the hydrocracking zone in reactor 1 by means of a withdrawal conduit 15 which extends from a point in the lower and denser portion of the catalyst bed 3 through the bubble cap tray 4 to a first discharge pot 16. Withdrawal conduit 15 is provided with a valve 17, which is normally closed when catalyst is not being withdrawn from the hydrocracking zone of the reactor. In accordance with the present invention, the discharge of particulate catalyst in admixture with hydrocarbon and hydrogen into discharge pot 16 is accomplished at a low pressure differential. Thus, the discharge pot is operated at substantially reactor pressure, the pressure differential existing between the discharge pot and the reactor being due substantially solely to frictional pressure loss. Ordinarily, the pressure differential between these two units is less than about 50 p.s.i. and preferably less than about 10 p.s.i., e.g. 1 to 10 p.s.i.

The present process utilizes discharge pot 16 as a fluid-solid separation zone For this purpose discharge pot 16 is provided with a vent conduit 18 which protrudes into the top of the pot and extends therefrom to conduit 13. The end of vent conduit 18 protruding into the discharge pot may be covered with a screen 19 of a mesh size suitable to prevent passage of catalyst particles through the vent conduit. The screen 19 may be of any suitable construction and have any suitable sized openings, such as from about 32 mesh to about 0.525 inch on the Tyler scale.

The primary purpose of screen 19 is to eliminate the need for separate apparatus for detecting the catalyst level in discharge pot 16, and not to act as a filter. For this purpose, it is generally desirable that the screen openings be slightly larger than the size of the catalyst particles, particularly when the catalyst particles are in the form of elongated extrudates, so as to prevent excessive plugging. Thus, as the level of catalyst extrudates in discharge pot 16 builds up in the vicinity of screen 19, the extrudates "interlock" and will not pass through the screen openings, even when the openings are of a larger size than the individual extrudate particles. The accumulation of extrudates on the underside of screen 19 results in a decrease of fluid flow through conduit 18, thereby indicating to the operator that discharge pot 16 is ready for dumping.

As shown in the drawing, conduit 18 is provided with valves 20 and 21 and ties in which conduit 13 leading to the high pressure liquid-gas separator 14. Thus, due to the lower pressure differential existing between discharge pot 16 and gas-liquid separator 14, the mixture of liquid hydrocarbon and hydrogen is vented through screen 19 to preclude passage of catalyst therewith and passed by conduits 18 and 13 to gas-liquid separator. Advantageously, the hydrogen-liquid hydrocarbon mixture is vented to the gas-liquid separator at a pressure differential not exceeding about 100 p.s.i., preferably from about 1 to about 20 p.s.i.

The liquid hydrocarbon separated from hydrogen in gas-liquid separator 14 may be removed through conduit 22 and pressure relief valve 23 and recovered as hydrocracked product. If desired, a portion of the recovered product may be returned to the hydrocracking zone of reactor 1 for further treatment. Separated hydrogen gas may be removed overhead from gas-liquid separator 14 through conduit 24 to compressor 8 to increase the pressure thereof to desired level and passed to reactor 1 in the manner previously described.

When the catalyst separated from hydrogen and liquid hydrocarbon reaches a predetermined level in discharge pot 16, it is withdrawn therefrom at a low pressure differential, e.g. less than about 50 p.s.i., through conduit 25, provided with valve 26, such as a plug valve, and passed to a second discharge pot 27, which may be maintained at or near atmospheric pressure by means of a vent 28 leading to the plant flare. For instance, when the catalyst particles are in the form of extrudates, the level thereof in discharge pot 16 may be permitted to build up to screen 19 having openings slightly larger than the minimum size of the catalyst particles to prevent excessive plugging. As previously noted, the accumulation of catalyst extrudates on the underside of screen 19 decreases fluid flow through conduit 18, thereby indicating to the operator that discharge pot 16 is ready for dumping. However, before dumping of particulate catalyst is commenced, the residual gas-liquid mixture in pot 16 is vented through conduits 18 and 18a leading to the plant flare by opening the valve in conduit 18a and closing valves 17 and 21. This practice enables the catalyst to be dumped at a low pressure differential from discharge pot 16 to the second discharge pot 27, thereby precluding serious erosion of conduit 25.

A portion of the hydrogen may be periodically drawn off conduit 9 and passed under high pressure (e.g. reactor pressure) by means of conduit 30, provided with a valve 31, to the lower portion of conduit 18 for the purpose of freeing clogged catalyst particles from screen 19 and pressuring up discharge pot 16 for the next catalyst withdrawal run. Thus, with valve 20 opened and valve 21 closed, a suitable amount of hydrogen may be introduced into conduit 18 to blow back into the discharge pot 16 any catalyst particles which may have plugged screen 19 and to bring the pressure of the discharge pot up to substantially reactor pressure.

It is, of course, expedient but not essential to employ hydrogen for the purposes of cleaning screen 19 and pressuring-up discharge pot 16. Various other fluid materials may also be used, including nitrogen or low molecular weight saturated hydrocarbons, e.g. methane, ethane and propane, and the like.

Once discharge pot 16 is pressured-up, the next catalyst withdrawal run may be commenced. Thus, valves 20 and 21 in vent conduit 18 are opened, thereby venting hydrogen from the discharge pot to gas-liquid separator 14 and slightly lowering the pressure of the discharge pot with respect to that of the reactor. Valve 17 is then opened and the desired amount of particulate catalyst, along with hydrogen and liquid hydrocarbon, is discharged by pressure differential and gravity through conduit 15 to discharge pot 16. Upon entering the discharge pot 16, the liquid hydrocarbon and hydrogen are vented through screen 19 and passed to gas-liquid separator 14 which, as previously noted, is operated at only slightly lower pressure with respect to the discharge pot, e.g. less than about 100 p.s.i. pressure differential and preferably from about 1 to about 20 p.s.i. differential. At least a portion of the liquid hydrocarbon so separated may be recoverd as hydrocracked product, while at least a portion of the separated hydrogen may be returned under high pressure to the hydrocracking zone of the reactor. Following discharge of the desired amount of particulate catalyst to discharge pot 16, valves 17 and 21 are closed and the valve in conduit 18a is opened thereby decreasing the pressure in pot 16 to substantially that at which the second pot 27 is maintained. Valve 20 and the valve in conduit 18a are then closed, and valve 26 is opened, thereby dumping particulate catalyst at a very low pressure differential from discharge pot 16 to the second pot 27. The catalyst is subsequently passed to disposal or regeneration. Following this operation, valve 26 is closed and a suitable amount of hydrogen is fed into conduit 18 under high pressure to clear screen 19 of accumulated catalyst and pressure-up discharge pot 16 for the next withdrawal.

The following non-limitative example is presented to further illustrate the present invention:

It was desired to withdraw about 100 pounds of cobalt-molybdate catalyst in the form of $\frac{1}{32}$ inch x $\frac{5}{16}$ inch extrudates from an ebullated bed hydrogenation zone maintained at a pressure of about 2500 p.s.i.g. For this purpose, a discharge pot 16 was positioned below the reactor as shown in the drawing. The discharge pot was not, however, provided with a vent conduit 18. This discharge procedure was found to be inefficient in that only a limited amount of catalyst (about 25 pounds), but large amounts of liquid hydrocarbon and hydrogen, were withdrawn from the hydrogenation zone.

In an effort to correct these difficulties, discharge pot 16 was provided with a vent conduit 18 leading to a low pressure fluid recovery zone (5 p.s.i.) at a point downstream of the reactor. The vent conduit was not, however, provided with a screen 19. This procedure greatly increased catalyst discharge efficiency from the reactor in that the desired 100 pounds could be withdrawn. However, as the catalyst level in discharge pot 16 increased, some catalyst was vented through conduit 18 with liquid hydrocarbon and hydrogen to the low pressure fluid recovery zone. The venting of catalyst in admixture with liquid hydrocarbon and hydrogen at a high pressure differential caused some erosion of pipes and valves.

Using the arrangement described in reference to the drawing, it was possible to withdraw the desired amount of catalyst from the hydrogenation zone, while avoiding erosion of pipes and valves caused by venting particulate catalyst in admixture with liquid hydrocarbon and hydrogen at high velocity. Thus, conduit 18 was connected to reactor effluent conduit 13, leading to a high pressure gas-liquid separator 14. The end of conduit 18 protruding into discharge pot 16 was provided with a 20 mesh screen. The mixture of catalyst, hydrogen and liquid hydrocarbon was withdrawn from the hydrogenation zone into the discharge pot 16 at a pressure differential of about 5 p.s.i. Admixture of hydrogen and liquid hydrocarbon, substantially free of catalyst, was vented to the gas-liquid separator 14 at a pressure differential of about 10 p.s.i. Hydrogen gas separated from liquid hydrocarbon in liquid-gas separator 14 was removed overhead, compressed to increase the pressure thereof to about 2550 p.s.i.g. and further utilized in the hydrogenation process. Separated liquid hydrocarbon was recovered at atmospheric pressure as hydrocracked product. After the flow rate through conduit 18 was substantially decreased, indicating catalyst accumulation on the underside of screen 19, valves 17 and 21 were closed and the valve in conduit 18a was opened, thereby venting residual hydrogen and liquid hydrocarbon to the plant flare and decreasing the pressure in discharge pot 16. The catalyst, substantially free of liquid hydrocarbon and hydrogen gas, was then discharged from pot 16 to a second pot 27 maintained at flare pressure (5 p.s.i.g.) by opening valve 26. Subsequently, the catalyst was passed to disposal. The catalyst discharge procedure may be repeated at suitable intervals, e.g. twelve hours. After repeated use, no serious erosion of pipes and valves was noticed.

It will, of course, be appreciated that while the invention has been described with respect to an ebullated bed hydrogenation process, it is also applicable to a fixed catalyst bed process, as well as to hydrocarbon treatment operations wherein gaseous materials other than hydrogen are employed. Thus, the invention may be used with advantage to discharge particulate solids from treatment zones in liquid hydrocarbon in which liquid hydrocarbon is subjected to nitration, oxidation, halogenations, sulfonation or like operations.

Therefore, we claim:

1. Method for discharging particulate solid in admixture with a fluid from a high pressure vessel which comprises discharging said mixture at a low pressure differential to a high pressure fluid-solid separation zone, venting the fluid, substantially free of particulate solids to a point downstream of said vessel until the venting of the fluid is decreased by accumulation of particulate solid in the fluid-solid separation zone, and subsequently recovering particulate solid, substantially free of fluid.

2. Method as in claim 1 wherein said fluid is a gas-liquid mixture and is vented from said fluid-solid separation zone to a gas-liquid separation zone downstream of said high pressure vessel.

3. Method as in claim 1 wherein said particulate solid is subsequently withdrawn from said fluid-solid separation zone at a low pressure differential.

4. Method as in claim 1 wherein the fluid-solid mixture is discharged from said high pressure vessel to said fluid-solid separation zone at a pressure differential not exceeding about 50 p.s.i.

5. Method as in claim 1 wherein the fluid is vented from said fluid-solid separation zone through a screen, whereby the venting of the particulate solid with fluid is precluded, and accumulation of solid on the underside of the screen decreases venting of fluid from the solid-fluid separation zone.

6. Method as in claim 5 wherein the particulate solid is in the form of extrudates having a size within the range of from about $\frac{1}{48}$ inch to about $\frac{1}{2}$ inch and said screen has openings slightly larger than the size of said solid particles, the size of said screen openings being within the range of from about 32 mesh to about 0.525 inch on the Tyler scale.

7. Method as in claim 1 wherein the fluid is vented at a low pressure differential from said fluid-solid separation zone to a point downstream of said high pressure vessel.

8. Method as in claim 7 wherein said fluid is a gas-liquid mixture and is vented at a low pressure differential from said fluid-solid separation zone to a high pressure gas-liquid separation zone downstream of said high pressure vessel.

9. Method as in claim 7 wherein the fluid-solid mixture is discharged from said high pressure vessel to said fluid-solid separation zone at a pressure differential not exceeding about 50 p.s.i. and the separated fluid is vented from said fluid-solid separation zone to a point downstream of said vessel at a pressure differential not exceeding about 100 p.s.i.

10. Method as in claim 8 wherein the fluid-solid mixture is discharged from said high pressure vessel to said fluid-solid separation zone at a pressure differential of from about 1 to about 10 p.s.i. and the separated fluid is vented from said fluid-solid separation zone to a point downstream of said vessel at a pressure differential of from about 1 to about 20 p.s.i.

11. Method for discharging particulate catalyst in admixture with hydrogen and liquid hydrocarbon from a hydrogenation zone maintained at a pressure of from about 1,000 to about 5,000 p.s.i.g. within a reactor which comprises discharging said mixture at a pressure differential not exceeding about 50 p.s.i. to a fluid-solid separation zone, venting a mixture of hydrogen and liquid hydrocarbon, substantially free of catalyst from said fluid-solid separation zone to a point downstream of said reactor until the venting of the mixture of hydrogen and liquid hydrocarbon is decreased by accumulation of particulate catalyst in the fluid-solid separation zone and subsequently recovering particulate catalyst, substantially free of hydrogen and liquid hydrocarbon, from said fluid-solid separation zone at a low pressure differential.

12. The method of claim 3 which additionally comprises terminating both the discharge from the high pressure vessel to the high pressure fluid-solid separation zone, and the venting of the fluid to the point downstream of said vessel after the accumulation of solid in the fluid-solid separation zone has decreased the venting of the fluid.

13. The method of claim 12, wherein the fluid-solid mixture is discharged from the high pressure vessel to the fluid-solid separation zone at a pressure differential not exceeding about 50 p.s.i.

14. The method of claim 12, wherein the recovery of the particulate solids substantially free of fluid comprises reducing the pressure of the fluid-solid separation zone to a pressure required for flaring entrained fluids, and discharging the particulate solids from the reduced pressure fluid-solid separation zone.

References Cited

UNITED STATES PATENTS

| | | | |
|---|---|---|---|
| 2,408,186 | 9/1946 | Atwell et al. | 208—157 |
| 2,441,820 | 5/1948 | Jewell | 208—157 |
| 3,003,580 | 10/1961 | Lanning | 208—157 |
| 3,079,329 | 2/1963 | Browning | 208—157 |

DELBERT E. GANTZ, *Primary Examiner.*

HERBERT LEVINE, *Assistant Examiner.*